HYBRID MIXER WITH D.-C. RETURN IN REGION OF RELATIVELY LAW ELECTRIC FIELD

Filed April 30, 1963

INVENTOR.
ERNEST W. LATTANZI
BY
Ezekiel Wolf, Wolf and Greenfield
ATTORNEYS

United States Patent Office 3,254,315
Patented May 31, 1966

3,254,315

HYBRID MIXER WITH D.-C. RETURN IN REGION OF RELATIVELY LOW ELECTRIC FIELD

Ernest W. Lattanzi, Melrose, Mass., assignor to Sage Laboratories, Inc., East Natick, Mass., a corporation of Massachusetts Filed Apr. 30, 1963, Ser. No. 276,798
9 Claims. (Cl. 333—11)

The present invention relates in general to hybrids and more particularly concerns a novel hybrid mixer with an improved means for establishing a D.-C. return for the flow of D.-C. current through the mixer crystals to the hybrid casing or other conducting surface normally maintained at reference potential.

The typical hybrid mixer comprises a hybrid junction having opposed signal input branches for receiving high frequency signals to be mixed and a pair of side branches having rectifying crystals for nonlinearly combining the two high frequency signals to provide the desired product signal. To maintain a high degree of balance, interference with R-F fields in a well-designed hybrid junction by the crystal and associated circuitry should be kept to a minimum. Yet, a D.-C. return for the crystals must normally be provided to return D.-C. crystal current to the conductive casing usually maintained at ground reference potential. The prior art approach typically locates the D.-C. return in the crystal holder itself. While this technique has not foreclosed satisfactory mixer operation, it does introduce fabrication problems and mechanical and electrical problems which are disadvantageous. The mechanical structure for such D.-C. returns is not only complex, but also presents considerable problems in connection with R-F impedance matching.

Accordingly, it is an important object of this invention to provide a hybrid with a D.-C. return so that the hybrid is immediately adaptable for use as a mixer upon insertion of mixing crystals.

It is another object of the invention to provide a hybrid in accordance with the preceding object which may still function effectively as a hybrid for other purposes.

It is still another object of the invention to provide a four coaxial terminal hybrid in accordance with the preceding objects.

It is still another object of the invention to provide a hybrid in accordance with the preceding objects in which the D.-C. return is relatively easy to fabricate, even when producing hybrids on a large scale basis.

According to the invention, the hybrid comprises two pairs of opposed branches. Each branch comprises a signal conductor and a reference conductor. One opposed pair of branches has each signal conductor connected by a small connecting lead to the reference conductor so that the conducting lead is at a point between signal and reference conductors where the field is substantially zero even in the absence of this thin conductor to negligibly interfere with the electromagnetic field in the hybrid.

Other features, objects and advantages of the invention will become apparent from the following specification when read in connection with the accompanying drawing in which.

Figure 1:
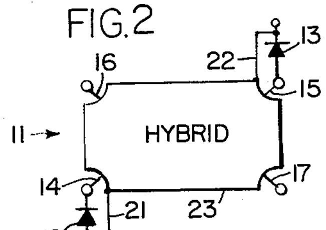
FIG. 1 is a schematic representation of a hybrid mixer according to the invention.

With reference now to the drawing and more particularly FIG. 1 thereof, there is shown a schematic representation of a hybrid 11 with mixer diodes 12 and 13 connected to opposed side branches 14 and 15, respectively, so that the apparatus may function as a balanced mixer for mixing high frequency signals applied to signal branches 16 and 17, respectively. The hybrid 11 has a property that when each of the branches is terminated in its charateristic impedance, energy applied to branch 16 divides equally between branches 13 and 14 while substantially no energy reaches branch 17. Typically, the energy which reaches branches 13 and 14 is in phase quadrature. Conducting leads 21 and 22 respectively connect the anode of diode 12 and the cathode of diode 13 to the normally grounded casing 23 of hybrid 11.

Figure 2:
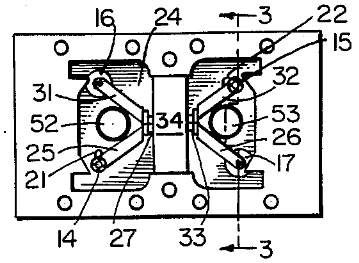
FIG. 2 is a top view of an exemplary embodiment of the invention top cover plate removed.
Figure 3:
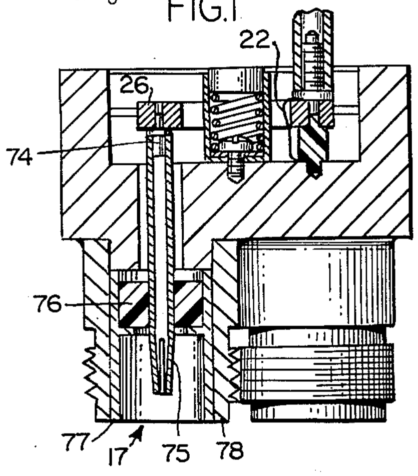
FIG. 3 is a sectional view through section 3—3 of FIG. 2.
Figure 4:
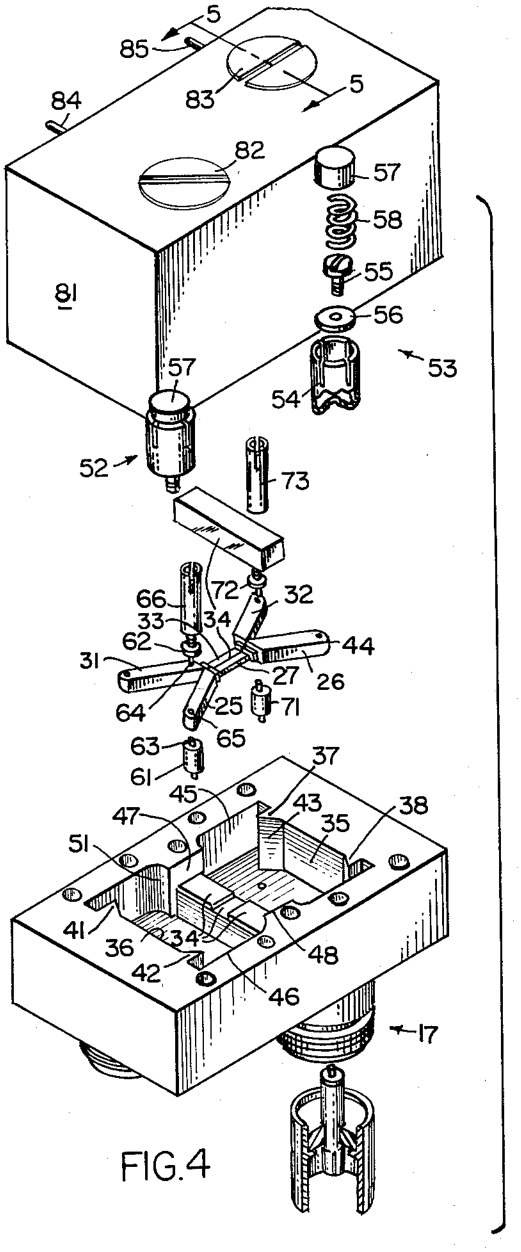
FIG. 4 is an exploded view of a hybrid mixer showing the crystal holder top with the elements shown in assembled form in FIGS. 2 and 3.

Referring to FIGS. 2–4, there is shown a substantially scale model of an exemplary embodiment of the invention suitable for balance mixing frequencies within the range of 4–8 gc. Where applicable, the same reference symbols identify corresponding elements throughout the drawing. Each of the branches comprises a coaxial terminal pair comprising an inner signal conductor coaxially surrounded by and insulatedly separated from an outer or reference conductor, usually formed as a part of the conductive casing maintained at ground potential. Thus, the signal branches 16 and 17 comprise coaxial terminals brought out through the bottom plate 24 while the side branches 14 and 15 comprises crystal holder coaxial terminal pairs brought out through a top housing 81 described below. The signal conductors of branches 14 and 17 are conductively interconnected by a conducting strip or link having end sections 25 and 26 interconnected by a central section 27 of smaller cross section than in sections 25 and 26 and joined thereto by impedance matching steps. The length of each section is of the order of a quarter wavelength at the center of the operating frequency range of the hybrid. In a similar manner signal branch 16 and side branch 15 are interconnected by a conducting link having similar end portions 31 and 32 interconnected by a similar middle portion 33 joined to the end portions by impedance matching step sections. The middle portions 27 and 33 are closely adjacent to one another but insulatedly separated and supported in an insulating block 34, these portions being centered within the generally H-shaped cavity. The structure exhibits four-quadrant symmetry about an axis passing through the intersection of the diagonals of the rectangular outline of the structure.

The end walls 35 and 36 includes projections 37 and 38 and 41 and 42, respectively, each of these projections having a vertical face like 43, defining a reference potential point, generally parallel to an end face like 44 defining a signal potential point, of the interconnecting links. The side walls 45 and 46 are formed with projections 47 and 48, respectively, joined to these side walls by arcuate surfaces such as 51.

Circular center posts 52 and 53 are located adjacent to but insulatedly separated from end portions 25 and 31 and end portions 26 and 32, respectively and maintain good electrical contact between bottom plate 24 and the top housing 81. They also function as inductive irises for mode suppression in the cavity and for providing additional capacitive coupling between end portions 26 and 32 and between end portions 25 and 31. These center posts comprise a cylindrical can 54 fastened to bottom plate 24 by the screw 55 and washer 56 and is formed with a slotted end so that the segments between the slots may exert pressure radially inward on the conducting plug 57 which is urged toward the bottom plate by the spring 58.

Each end of a conducting link is supported between an insulating spacer like 61 and a conducting spacer like 62. Both spacers 61 and 62 are formed with stems like 63 and 64, respectively, which fit in the opening 65 of end portion 25. The hollow coaxial inner terminal like 66, or another type of inner terminal, may then fit over the threaded upper end of conducting spacer 62. Its lower end may be soldered to end portion 25. In a similar manner insulating spacer 71 supports end portion 32 which in turn carries conducting spacer 72 to which the coaxial inner terminal 73 is attached. And as best seen in FIG. 3, the conducting plug 74 contacts end portion 26 to which coaxial inner terminal 75 is attached. An annular insulating spacer 76 separates coaxial inner terminal 75 from coaxial outer terminal 77 which in turn resides within the annular threaded casing 78 formed as a part of bottom plate 24.

The D.-C. returns 22 and 21, typically of very fine .004" diameter wire, are brought almost vertically down to bottom conducting plate 24 generally parallel to the electric field established in the cavity where the magnitude of the field is nearly zero.

Figure 5:
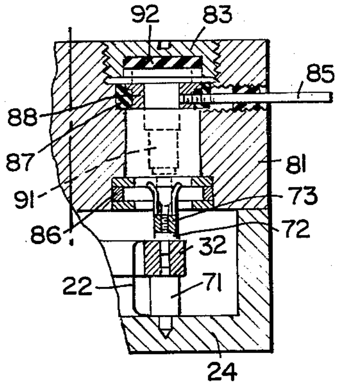
FIG. 5 is a sectional view through section 5—5 of FIG. 4 illustrating details of the crystal holding cavity.

The upper crystal holder block 81 carries the mixer crystals between screw caps 82 and 83 and provides the I.-F. frequency between leads 84 and 85. Referring especially to FIG. 5, there is shown an enlarged sectional view through sections 5—5 of FIG. 4 to better illustrate the internal structure of the crystal holder block 81. An annular stepped matching section 86 coaxially surrounds the point of contact between center conductor 73 and the inner contact of the crystal. An annular ring 87 of dielectric material, such as rexolite, surrounds an annular conducting ring 88 and functions as the dielectric of a capacitor which bypasses microwave but not I.-F. frequencies. The inside surface of ring 88 contacts the upper outside contact of the crystal. Ring 88 is formed with a threaded opening in alignment with an opening in dielectric ring 87 for accommodating the threaded end of I.-F. output lead 85. A disc 92 of rubber or other suitable insulating material both insulates the upper outside contact of the crystal from the housing and coacts with the spring-like end of inner conductor 73 to provide a shock-resistant mounting for the crystal. One end of the .004" diameter D.-C. return wire 22 is captured in the hole in bottom plate 24 as the insulating spacer 71 is pressed into place. The other end is soldered to the top of the strip end portion.

The relative freedom of the structure from complexity facilitates relatively rapid fabrication with a consequent reduction in costs. Moreover, the parts themselves are of relatively low cost. And relatively simple structure functions to match the crystal holding compartment to the hybrid structure at high frequencies to achieve exceptional electrical performance.

The effect of the hybrid structure is that the effective electrical pathlength between each of signal brances 16 and 17 and side branches 14 and 15 differs by a quarter wavelength, corresponding substantially to 90 electrical degrees. Energy applied to branch 16 does not reach branch 17 and energy applied to branch 17 does not reach branch 16. Thus, energy applied to either of branches 16 or 17 reaches branches 14 and 15 in substantial phase quadrature.

In an exemplary embodiment of the invention operative over a frequency range from 4–8 gc. employing type 1N23E mixer crystals, signals within the operating frequency range applied to branches 16 and 17 were mixed to provide an I.-F. frequency within the range from 0–60 mc. while maintaining an isolation of 10 db between branches 16 and 17 to provide balanced mixing. The VSWR observed at branches 16 and 17 was less than 1.50 over the operating frequency range, and the noise figure was less than 8.5 db. The invention is also applicable to other types of hybrid mixers such as those employing the coaxial hybrid described in U.S. Patent No. 3,040,275.

It is evident that those skilled in the art may now make numerous modifications of and departures from the specific embodiment described herein without departing from the inventive concepts. Consequently, the invention is to be construed as limited only by the spirit and scope of the appended claims.

What is claimed is:

1. A hybrid comprising,
means defining first and second side branches and first and second signal branches having the characteristic that when said branches are terminated in their characteristic impedance energy applied to one of said signal branches divides equally between said side branches without being delivered to the other of said signal branches,
conducting means defining a cavity and normally maintained at reference potential intercoupling a reference conductor in each of said side and signal branches,
each of said side and signal branches having a signal conductor,
and first and second conducting leads inside said cavity connecting first and second signal points of said first and second side branch signal conductors respectively to first and second reference points of said conducting means said conducting means being formed with means defining a third reference point much closer to said first signal point than is said first reference point and with means defining a fourth reference point much closer to said second signal point than is said second reference point.

2. A hybrid in accordance with claim 1 and further comprising,
first and second unilaterally conducting devices intercoupling the signal and reference conductors of said first and second side branches respectively.

3. A hybrid operative over a frequency range embracing a prescribed wavelength comprising,
means normally maintained at reference potential defining a cavity,
first, second, third and fourth signal terminals extending into said cavity,
a first conducting link intercoupling said first and second signal terminals,
a second conducting link intercoupling said third and fourth signal terminals,
each of said conducting links having a quarter said wavelength central portion intercoupling quarter said wavelength end portions with said central portions being separated but closely adjacent to one another to establish high frequency coupling of energy within said frequency range along their common quarter wavelength,
said conducting links being symmetrical about three orthogonal axes of said cavity,
first and second circular conducting posts extending between top and bottom walls of said cavity defining means for suppressing undesired modes in said cavity and introducing additional capacitive coupling between end portions of said conducting links to coact with said links,
said cavity defining means and said signal terminal to provide hybrid operation among said terminals within said frequency range,
a first thin conducting wire connecting one end of said first conducting link near said first signal terminal to said cavity bottom wall at a point immediately below said first signal terminal,
and a second thin conducting wire connecting one end of said second conducting link near said third signal terminal and nearer to said second terminal than to said first signal terminal to said cavity bottom wall immediately below said third signal terminal,
said first and second thin conducting wires being in a region of said cavity where the electric field is substantially zero when energy of frequency within said frequency range is applied to said second and fourth signal terminals.

4. A hybrid in accordance with claim 3 and further comprising, first and second insulating spacers between said first and second conducting link one ends respectively and respective openings in said bottom wall, which openings also accommodate respective end portions of said first and second thin conducting wires.

5. A hybrid in accordance with claim 3 and further comprising, means above said top wall and immediately above said first and second conducting link one ends defining first and second crystal cavities respectively embracing the top ends of said first and third signal terminals respectively, and first and second signal leads insulatedly separated from said crystal cavity defining means extending through the latter means into said first and second crystal cavities respectively for withdrawing energy from said cavities.

6. A hybrid in accordance with claim 5, and further comprising, means including the means for insulatedly separating said signal leads from the crystal cavity defining means for establishing a capacitive path from said signal leads to the latter means which is low impedance for signals within said frequency range but is high impedance to signals of a frequency many times lower than the lowest frequency in said range.

7. A hybrid in accordance with claim 6 wherein the last mentioned means comprises, an annular ring of conducting material at the top of each crystal cavity for establishing contact with the the top electrode of a crystal, and an annular ring of dielectric material between the inside wall of each crystal cavity defining means and the latter annular ring of conducting material.

8. A hybrid in accordance with claim 7 wherein said cavity defining means includes a top cover plate immediately above a disc of flexible insulating material which material is adapted to contact the top electrode of a crystal, and each of said upper ends is formed with resilient fingers adapted to contact the lower electrode of a crystal and coact with said disc to provide shock mounting of a crystal in a crystal cavity.

9. A hybrid in accordance with claim 8 and further comprising, first and second crystals in said first and second crystal cavities respectively, each crystal having a lower electrode engaged by respective ones of said fingers and a top electrode engaged by a respective disc and a respective annular ring of conducting material at the top of the crystal cavity.

References Cited by the Examiner

UNITED STATES PATENTS

| | | | |
|---|---|---|---|
| 2,813,972 | 11/1957 | Anderson et al. | 333—11 |
| 3,072,850 | 1/1963 | Whitehorn | 333—11 |

FOREIGN PATENTS

| | | |
|---|---|---|
| 818,018 | 6/1957 | Great Britain. |

HERMAN KARL SAALBACH, *Primary Examiner.*

G. TABAK, P. L. GENSLER, *Assistant Examiners.*